US012584075B2

(12) United States Patent
Maksuta et al.

(10) Patent No.: US 12,584,075 B2
(45) Date of Patent: Mar. 24, 2026

(54) REDESIGNED LUBRICANT MAIN CHAIN REPEAT UNIT FOR ENHANCED THERMAL STABILITY AND TAILORED PERFORMANCE

(71) Applicant: Western Digital Technologies, Inc., San Jose, CA (US)

(72) Inventors: Daniel Demori Maksuta, San Jose, CA (US); Hantao Zhou, San Jose, CA (US); Ao Fan, Shenzhen (CN); Jianming Wen, Pleasanton, CA (US); Charles Cheng-Hsing Lee, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/634,052

(22) Filed: Apr. 12, 2024

(65) Prior Publication Data

US 2025/0320422 A1 Oct. 16, 2025

(51) Int. Cl.
*C10M 105/54* (2006.01)
*C08G 65/00* (2006.01)
(Continued)

(52) U.S. Cl.
CPC ......... *C10M 105/54* (2013.01); *C08G 65/007* (2013.01); *G11B 5/725* (2013.01);
(Continued)

(58) Field of Classification Search
CPC .............. C08G 65/007; C10M 105/54; C10M 2211/0425; C10N 2030/08; C10N 2040/18; G11B 5/725; G11B 2005/0021
See application file for complete search history.

(56) References Cited

U.S. PATENT DOCUMENTS 8,668,995 B2 3/2014 Shimizu et al.
8,697,262 B2 4/2014 Hamakubo et al.
(Continued)

FOREIGN PATENT DOCUMENTS

WO 2019039265 A1 2/2019
WO 2019087548 A1 5/2019

OTHER PUBLICATIONS

International Search Report and Written Opinion for Application No. PCT/US25/11481, dated Apr. 29, 2025, 11 pages.

*Primary Examiner* — James C Goloboy
(74) *Attorney, Agent, or Firm* — LOZA & LOZA, LLP; Gabriel Fitch

(57) ABSTRACT

A lubricant provides enhanced performance at high temperatures, along with a higher evaporation temperature, where the main-chain includes a moiety with a rotational energy barrier that is higher than $CF_2$. The lubricant has the general Formula (I):

$$Rc—((Rb)_m—Re)_n \quad (I)$$

wherein Rc is a multivalent central group, Rb is a main chain group having a constituent with a higher rotational energy threshold than $CF_2$, Re is an end group having at least one anchoring functional group, m is from 2 to 50, and n is from 2 to 8. The constituent with a higher rotational energy threshold than $CF_2$, may be a substituted or non-substituted aromatic group.

9 Claims, 9 Drawing Sheets

(51) Int. Cl.

| | |
|---|---|
| ***C10N 30/08*** | (2006.01) |
| ***C10N 40/18*** | (2006.01) |
| ***G11B 5/00*** | (2006.01) |
| ***G11B 5/725*** | (2006.01) |

(52) U.S. Cl.

CPC . *C10M 2211/0425* (2013.01); *C10N 2030/08* (2013.01); *C10N 2040/18* (2013.01); *G11B 2005/0021* (2013.01)

(56) References Cited

U.S. PATENT DOCUMENTS

| | | | |
|---|---|---|---|
| 8,734,966 B2 | 5/2014 | Sagata et al. | |
| 9,090,772 B2 | 7/2015 | Tonelli et al. | |
| 9,805,755 B1 | 10/2017 | Yang | |
| 9,911,447 B2 | 3/2018 | Sagata | |
| 10,047,317 B2 | 8/2018 | Sagata et al. | |
| 10,442,893 B2 | 10/2019 | Valsecchi et al. | |
| 10,766,844 B2 | 9/2020 | Valsecchi et al. | |
| 11,308,985 B2 | 4/2022 | Lu et al. | |
| 11,591,536 B2 | 2/2023 | Monzani et al. | |
| 2014/0141284 A1 | 5/2014 | Yang et al. | |
| 2021/0246264 A1 | 8/2021 | Fontana et al. | |
| 2021/0277258 A1* | 9/2021 | Mitsuhashi ...... | C08G 65/33317 |
| 2022/0033582 A1 | 2/2022 | Sagata | |
| 2022/0267516 A1 | 8/2022 | Sagata et al. | |
| 2022/0282176 A1* | 9/2022 | He ....................... | G11B 5/7257 |
| 2023/0038701 A1 | 2/2023 | Honda et al. | |

* cited by examiner

REDESIGNED LUBRICANT MAIN CHAIN REPEAT UNIT FOR ENHANCED THERMAL STABILITY AND TAILORED PERFORMANCE

FIELD

The disclosure relates to lubricants, and more particularly to high temperature lubricants, which may be used with media configured for magnetic recording, e.g., for Heat Assisted Magnetic Recording (HAMR), including fluorinated lubricants having repeating units containing moieties with a higher rotational energy barrier than the fluorinated component.

INTRODUCTION

Magnetic storage systems, such as a Hard Disk Drive (HDD), are utilized in a wide variety of devices in both stationary and mobile computing environments. Examples of devices that incorporate magnetic storage systems include data center storage systems, desktop computers, portable notebook computers, portable hard disk drives, network storage systems, High Definition Television (HDTV) receivers, vehicle control systems, cellular or mobile telephones, television set top boxes, digital cameras, digital video cameras, video game consoles, and portable media players.

A typical disk drive includes magnetic storage media in the form of one or more flat disks or platters. The disks generally include two main components, namely, a substrate material that gives it structure and rigidity, and a magnetic media coating that stores the magnetic signals that represent data in a recording layer within the coating. The typical disk drive also includes a read head and a write head, generally in the form of a magnetic transducer which can sense and/or change the magnetic fields stored on the recording layer of the disks. Heat Assisted Magnetic Recording (HAMR) is a recording technique that can increase the Areal Density Capability (ADC) of written data on a magnetic storage medium having very high coercivity with high-temperature assistance. However, the high recording temperatures applied to the media may present challenges. Other examples of magnetic storage media include flexible tape media usable for magnetic tape recording.

As a result of the high temperatures associated with HAMR technology, suitable lubricants for use in HAMR media, or other HDD media, may benefit from high thermal stability. In addition, the higher temperatures also increase the presence of contaminants which may negatively affect data storage. As such, there is a need in the art for high temperature lubricants (e.g., lubricants capable of withstanding high temperatures) having properties suitable for use in HDDs, including the ability to sequester and/or remove contaminants prior to the contaminants interfering with data storage or other operational processes.

SUMMARY

In one aspect, this disclosure provides a fluorinated lubricant comprising:

$$Rc—((Rb)_m—Re)_n \quad (I)$$

wherein Rc is a multivalent central group,

Rb is a main chain group having a constituent with a higher rotational energy threshold than $CF_2$, Re is an end group having at least one anchoring functional group, m is from 2 to 50, and n is from 2 to 8.

In one aspect, the lubricant described above wherein the constituent with the higher rotational energy threshold than $CF_2$, comprises a substituted or non-substituted aromatic group.

In one aspect, the lubricant described above wherein the constituent with the higher rotational energy threshold than $CF_2$, comprises an aromatic group substituted with at least one of $—C_nH_{2n+1}$ or $—(C{=}O)—C_nH_{2n+1}$ where n is from 1 to 6.

In one aspect, the lubricant described above wherein the constituent with the higher rotational energy threshold than $CF_2$, comprises an aromatic group substituted with at least one of $—C_nR_{2n+1}$ or $—(C{=}O)—C_nR_{2n+1}$ where R is selected from the group consisting of F, Cl, Br and I, and n is from 1 to 6.

In one aspect, the lubricant described above wherein the constituent with the higher rotational energy threshold than $CF_2$ is selected from the group consisting of benzene, naphthalene, phenanthrene and anthracene.

In one aspect, the lubricant described above wherein the constituent with the higher rotational energy threshold than $CF_2$ is ortho, meta or para substituted benzene.

In one aspect, the lubricant described above wherein the constituent with the higher rotational energy threshold than $CF_2$ is ortho, meta or para substituted benzene, and unsubstituted sites on the ortho, meta or para Rb substituted benzene are perfluorinated.

In one aspect, the lubricant described above wherein the constituent with the higher rotational energy threshold than $CF_2$ is:

(V)

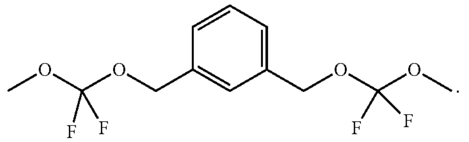

In one aspect, the lubricant described above wherein the constituent with the higher rotational energy threshold than $CF_2$ is:

(VI)

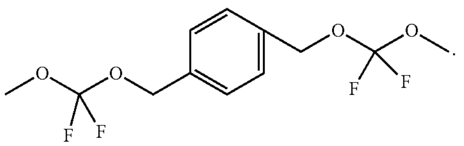

In one aspect, the lubricant described above wherein the constituent with the higher rotational energy threshold than $CF_2$ is:

(VII)

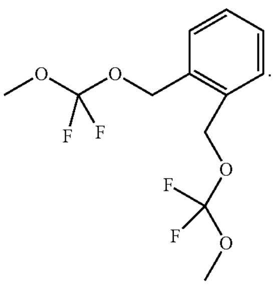

In one aspect, the lubricant described above wherein the constituent with the higher rotational energy threshold than $CF_2$ is:

(iv)

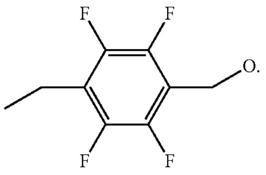

In one aspect, the lubricant described above wherein the constituent with the higher rotational energy threshold than $CF_2$ is:

(v)

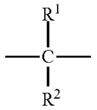

wherein $R^1$ and $R^2$ are each independently fluorinated or nonfluorinated $C_1$ to $C_{10}$ alkyl which may also include ether and carbonyl linkages.

In one aspect, the lubricant described above wherein the constituent with the higher rotational energy threshold than $CF_2$ is:

(vi)

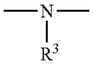

wherein $R^3$ is fluorinated or nonfluorinated $C_1$ to $C_{10}$ alkyl which optionally also includes at least one of ether and carbonyl linkages.

In one aspect, the lubricant described above wherein the constituent with the higher rotational energy threshold than $CF_2$ is:

(VIII)

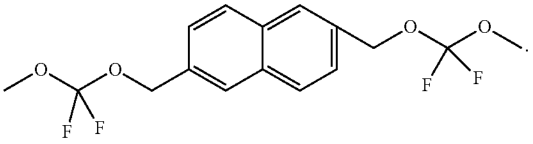

In one aspect, the lubricant described above wherein the constituent with the higher rotational energy threshold than $CF_2$ is:

(IX)

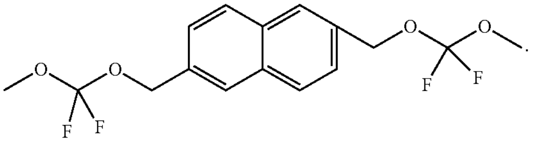

In one aspect, the lubricant described above wherein the constituent with the higher rotational energy threshold than $CF_2$ is:

(XII)

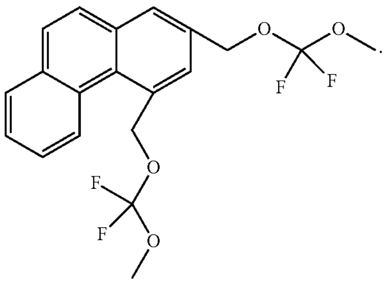

In one aspect, the lubricant described above wherein the constituent with the higher rotational energy threshold than $CF_2$ is:

(XIII)

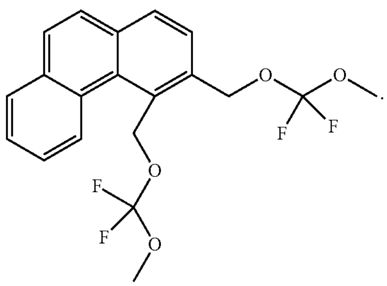

In one aspect, a magnetic recording medium, comprising: a magnetic recording layer on a substrate; a protective overcoat on the magnetic recording layer; and a lubricant layer comprising the lubricant described above on the protective overcoat.

In one aspect, a data storage system, comprising: at least one magnetic head; a magnetic recording medium including the lubricant described above; a drive mechanism for positioning the at least one magnetic head over the magnetic recording medium; and a controller electrically coupled to the at least one magnetic head for controlling operation of the at least one magnetic head.

In one aspect, a data storage system, comprising: a slider comprising at least one magnetic head and an air bearing surface (ABS), wherein a lubricant according to claim 1 is disposed on the ABS; and a magnetic recording medium including a magnetic recording layer; wherein the slider is configured to write information to the magnetic recording layer using heat assisted magnetic recording (HAMR).

Other aspects and advantages of the present disclosure will become apparent from the following detailed description and examples, when considered in conjunction with the drawings.

DETAILED DESCRIPTION

Figure 1A:
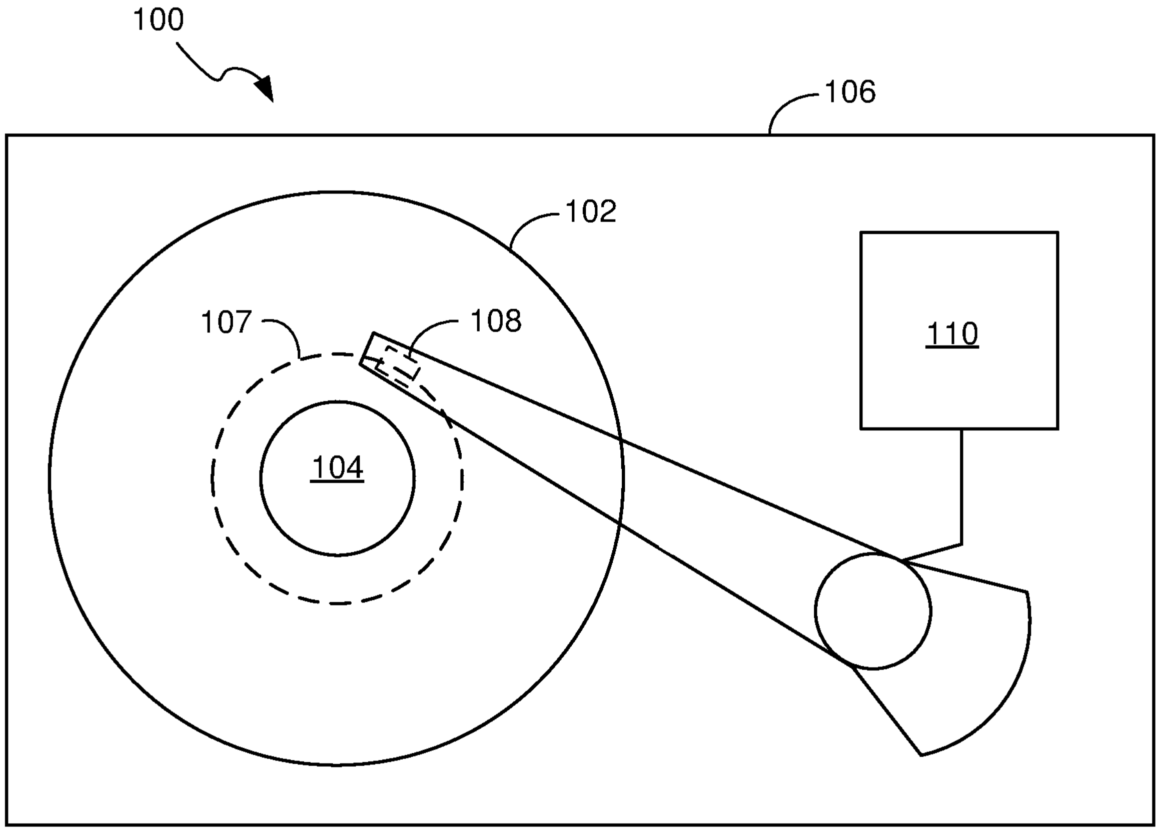
FIG. 1A is a diagram schematically illustrating a data storage device including a slider and a magnetic recording medium in accordance with one aspect of the disclosure.

Heat Assisted Magnetic Recording (HAMR) systems operate at substantially higher temperatures than traditional magnetic recording systems. HAMR is an example of magnetic recording within the class of Energy Assisted Magnetic Recording (EAMR) techniques, where conventional magnetic recording is supplemented by other energy used in the system. Other examples of EAMR may include Microwave Assisted Magnetic Recording (MAMR) and applications of electric current into various conductive and/or magnetic structures near the main pole. This disclosure is generally directed to lubricants having high thermal stability that can be used in conjunction with a magnetic recording medium and/or a magnetic data storage system including a HAMR, or more generally EAMR, magnetic recording medium or storage system.

To achieve this goal, it is notable that the main-chain repeat unit of lubricant molecules has not undergone any significant redesign since the conception of fluorinated lubricants for the HDDs. Areas that are typically investigated for redesign include the end group and the core/linker group of the lubricant. There are advantages to be gained by the redesign of the main-chain repeat unit of the lubricant molecule. Additionally, it allows for the unexpected improvement of the lubricant in ways previously not considered.

In short, the disclosure pertains to lubricants with a stiffened main-chain obtained by modulating the rotational energy of the main-chain. In one aspect, one such lubricant comprises or is according to general Formula (I):

$$Rc—((Rb)_m—Re)_n \tag{I}$$

wherein Rc is a multivalent central group, Rb is a main chain group having a constituent with a higher rotational energy threshold than $CF_2$, Re is an end group having at least one anchoring functional group, m is from 2 to 50, and n is from 2 to 8.

When the lubricant has a divalent central group, the lubricant comprises or is of the general Formula (Ia):

$$Re^1—Rb^1{}_m—Rc—Rb^2{}_n—Re^2 \tag{Ia}$$

wherein Rc is a divalent central group, $Rb^1$ and $Rb^2$ each independently are a main chain group having a constituent with a higher rotational energy threshold than $CF_2$, $Re^1$ and $Re^2$ are each independently an end group having at least one anchoring functional group, and m and n are each independently from 2 to 50.

The stiffened main-chain structure of the lubricant provides improved head-disk clearance, lube pickup, and other properties including improved mechanical integration robustness. The presence of groups having a rotational energy barrier that is greater than the rotational energy barrier of $CF_2$ (e.g., aromatic groups, the aromatic functional groups) increases thermal stability and reduces the contamination vulnerability when compared with lubricants known in the art.

Definitions

As used herein, and unless otherwise specified, the term "$C_n$" means hydrocarbon(s) having n carbon atom(s) per molecule, where n is a positive integer. Likewise, a "$C_m$-$C_y$" group or compound refers to a group or compound comprising carbon atoms at a total number thereof in the range from m to y. Thus, a $C_1$-$C_4$ alkyl group refers to an alkyl group that includes carbon atoms at a total number thereof in the range of 1 to 4, e.g., 1, 2, 3 and 4.

"Moiety" refers to one or more covalently bonded atoms which form a part of a molecule. The terms "group," "radical," "moiety", and "substituent" may be used interchangeably.

The terms "hydrocarbyl radical," "hydrocarbyl group," or "hydrocarbyl" may be used interchangeably and are defined to mean a group consisting of hydrogen and carbon atoms only. Preferred hydrocarbyls are $C_1$-$C_{50}$ radicals that may be linear, branched, or cyclic, and when cyclic, aromatic or non-aromatic. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like, aryl groups, such as phenyl, benzyl naphthyl, and the like.

For purposes herein, a "heteroatom" is any non-carbon atom, selected from groups 13 through 17 of the periodic table of the elements. In one or more aspects, heteroatoms are non-metallic atoms selected from B, Si, pnictogens (N, P, As, Sb, Bi), chalcogens (O, S, Se, Te), and halogens (F, Cl, Br, I).

Unless otherwise indicated, the term "substituted" means that at least one hydrogen atom has been replaced with at least one non-hydrogen atom or a functional group.

For purposes herein, when a segment comprises or includes a particular moiety, it is to be understood that the moiety may be bonded to the respective segment at any substitutable position in which a hydrogen atom may be replaced with a chemical bond between the moiety and the segment.

For purposes herein, a functional group includes one or more of a hydrocarbyl group, a heteroatom, or a heteroatom containing group, such as B, Si, pnictogen, chalcogen, or halogen (such as Br, Cl, F or I), at least one of —OR*, $—NR*_2$, —NR*—CO—R*, —OR*, R*—O—CO—R*, —CO—O—R*, —SeR*, —TeR*, $—PR*_2$, P(III) groups including $—P(OR)_2$, $—PO—(OR*)_2$ and $—O—PO—(OR*)_2$, $—AsR*_2$, $—SbR*_2$, —SR*, $—SO_2—(OR*)_2$, $—BR*_2$, $—SiR*_3$, $—(CH_2)_q—SiR*_3$, or a combination thereof, wherein q is 1 to 10 and each R* is independently a hydrogen, a hydrocarbyl or a halocarbyl radical, and two or more R* may join together to form a substituted or unsubstituted completely saturated, partially unsaturated, or aromatic cyclic or polycyclic ring structure, or where at least one heteroatom has been inserted within a hydrocarbyl ring. In an aspect, R* is H such that the functional group may be —OH, $—NH_2$, —NH—CO—H, —OH, H—O—CO—H, —CO—O—H, —SeH, —TeH, $—PH_2$, P(III) groups including $—P(OH)_2$, $—PO—(OH)_2$ and $—O—PO—(OH)_2$, $—AsH_2$, $—SbH_2$, —SH, $—SO_2—(OH)_2$, $—BH_2$, $—SiH_3$, $—(CH_2)_q—SiH_3$, or a combination thereof.

In one or more aspects, functional groups may include: a saturated $C_1$-$C_{50}$ radical, an unsaturated $C_1$-$C_{50}$ radical, an alicyclic $C_3$-$C_{50}$ radical, a heterocyclic $C_3$-$C_{50}$ radical, an aromatic $C_5$-$C_{80}$ radical, a heteroaromatic $C_5$-$C_{80}$ radical, a cyclotriphosphazine radical, a B, Si, pnictogen, chalcogen, or halogen, —OR*, $—NR*_2$, —NR*—CO—R*, —OR*, —O—CO—R*, —CO—O—R*, —SeR*, —TeR*, $—PR*_2$, P(III) groups including $—P(OR)_2$, $—PO—(OR*)_2$ and $—O—PO—(OR*)_2$, $—N{=}P(NR*_2)_3$, $—AsR*_2$, —SR*, $—SO_2—(OR*)_2$, $—BR*_2$, $—SiR*_3$, $—(CH_2)_q—SiR*_3$, $—(CF_2)_q—SiR*_3$, or a combination thereof, wherein q is 1 to 10 and each R* is, independently a hydrogen, a pnictogen, a chalcogen, a halogen, or a saturated, unsaturated, aromatic, polycyclic aromatic, heteroaromatic, alicyclic, and/or heterocyclic $C_4$-$C_{50}$ radical. Anchoring functional groups can also be least one of —OH, $—NH_2$, —NH—CO—H, —O—CO—H, —CO—O—H, —SeH, —TeH, $—PH_2$, P(III) groups including $—P(OH)_2$, $—PO—(OH)_2$ and $—O—PO—(OH)_2$, $—N{=}P(NH_2)_3$, $—AsH_2$, —SH, $—SO_2—(OH)_2$, $—BH_2$, $—SiH_3$, $—(CH_2)_q—SiH_3$, $—(CF_2)_q—SiH_3$, or a combination thereof.

For purposes herein, a cyclic functional group is a monovalent alicyclic $C_3$-$C_{50}$ alkyl radical, an alicyclic $C_3$-$C_{50}$ alkenyl radical, a heterocyclic $C_3$-$C_{50}$ radical, an aromatic $C_5$-$C_{50}$ radical, a polycyclic aromatic $C_{10}$-$C_{50}$ radical, a heteroaromatic $C_5$-$C_{50}$ radical, a cyclotriphosphazine radical, or a combination thereof. Unless otherwise indicated, the cyclic functional group may be further substituted with another cyclic functional group and/or with one or more functional groups comprising one or more of a saturated $C_1$-$C_{50}$ radical, an unsaturated $C_1$-$C_{50}$ radical, an alicyclic $C_3$-$C_{50}$ radical, a heterocyclic $C_3$-$C_{50}$ radical, an aromatic $C_5$-$C_{50}$ radical, a heteroaromatic $C_5$-$C_{80}$ radical, a cyclotriphosphazine radical, B, Si, a pnictogen, a chalcogen, or a halogen, —OR*, $—NR*_2$, —NR*—CO—R*, —OR*, —O—CO—R*, —CO—O—R*, —SeR*, —TeR*, P(III) groups including $—PR*_2$, $—PO—(OR*)_2$ and $—O—PO—(OR*)_2$, $—N{=}P(NR*_2)_3$, $—AsR*_2$, —SR*, $—SO_2—(OR*)_2$, $—BR*_2$, $—SiR*_3$, $—(CH_2)_q—SiR*_3$, $—(CF_2)_q—SiR*_3$, or a combination thereof, wherein q is 1 to 10 and each R* is, independently a hydrogen, a pnictogen/chalcogen/halogen, or a saturated, unsaturated, aromatic, polycyclic aromatic, heteroaromatic, alicyclic, and/or a heterocyclic $C_1$-$C_{50}$ radical.

For purposes as described herein, an anchoring functional group which is selected for being attachable to and/or engageable with a protective overcoat of a magnetic recording medium refers to a functional group having increased affinity for the protective overcoat of a magnetic recording medium relative to the affinity of a fluoroalkenyl ether moiety, a perfluoroalkyl ether moiety, a perfluoroalkenyl ether moieties, to that same surface. Increased affinity may include Van der Waals forces, weak London Dispersion forces, dipole-dipole forces, polar interactions, polarizability/hydrogen bonding interactions, and/or the like, and/or may include the formation of one or more types of bonds, backbonding (the exchange of electrons between an atomic orbital on one atom and an anti-bonding orbital on another atom), and/or dative bonds (a covalent bond (a shared pair of electrons) in which both electrons come from the same atom) with the protective overcoat of a recording medium. In one or more aspects, a functional group which is attachable to and/or engageable with a protective overcoat of a magnetic recording medium refers to one or more functional groups having increased affinity for the carbon overcoat (COC) layer of the recording medium, relative to the affinity of a fluoroalkenyl ether moiety, a perfluoroalkyl ether moiety, a perfluoroalkenyl ether moieties to that same surface. In some aspects, functional groups attachable to and/or engageable with a protective overcoat of a magnetic recording medium include radicals comprising one or more hydroxyl moieties (—OH), or comprising a hydroxyl moiety (—OH).

A "heterocyclic ring," also referred to herein as a heterocyclic radical, is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring. A substituted heterocyclic ring is a heterocyclic ring where a hydrogen of one of the ring atoms is substituted, e.g., replaced with a hydrocarbyl, or a heteroatom containing group.

A "compound" refers to a substance formed by the chemical bonding of a plurality chemical elements. A "derivative" refers to a compound in which one or more of the atoms or functional groups of a precursor compound have been replaced by another atom or functional group, generally by means of a chemical reaction having one or more steps.

Fluorinated alkyl ethers including fluoroalkyl ethers, fluoroalkenyl ethers, perfluoroalkyl ethers, perfluoroalkenyl ethers, or combinations thereof, refer to branched or linear chain of $C_1$ to $C_{20}$ alkyl ethers in which one or more hydrogen atoms are substituted with fluorine. In one aspect, all or a majority of alkyl hydrogen atoms are substituted with fluorine.

For any particular compound disclosed herein, any general or specific structure presented also encompasses all conformational isomers, regio-isomers, and stereoisomers that may arise from a particular set of substituents, unless stated otherwise. Similarly, unless stated otherwise, the general or specific structure also encompasses all enantiomers, diastereomers, and other optical isomers whether in enantiomeric or racemic forms, as well as mixtures of stereoisomers, as would be recognized by a skilled artisan.

As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

As used herein, a moiety which is chemically identical to another moiety is defined as being identical in overall composition exclusive of isotopic abundance and/or distribution, and/or exclusive of stereochemical arrangement such as optical isomers, confirmational isomers, spatial isomers, and/or the like.

HAMR System for Employing Lubricant

FIG. 1A is a top schematic view of a data storage device 100 (e.g., disk drive or magnetic recording device) configured for Heat Assisted Magnetic Recording (HAMR) including a slider 108 and a magnetic recording medium 102 having a lubricant according to one or more aspects of the disclosure. The laser (not visible in FIG. 1A but see 114 in FIG. 1B) is positioned with a head/slider 108. Disk drive 100 may include one or more disks/media 102 to store data. The disks/media 102 reside on a spindle assembly 104 that is mounted to a drive housing 106. Data may be stored along tracks in the magnetic recording layer of disk 102. The reading and writing of data is accomplished with the head 108 (slider) that may have both read and write elements (108*a* and 108*b*). The write element 108*a* is used to alter the properties of the magnetic recording layer of disk 102 and thereby write information thereto. In one aspect, head 108 may have magneto-resistive (MR), Giant Magneto-Resistive (GMR), or Tunnel Magneto-Resistive (TMR) elements. In an alternative aspect, head 108 may be another type of head, for example, a Hall effect head. In operation, a spindle motor (not shown) rotates the spindle assembly 104, and thereby rotates the disk 102 to position the head 108 at a particular location along a desired disk track 107. The position of the head 108 relative to the disk 102 may be controlled by the control circuitry 110 (e.g., a microcontroller). It is noted that while an example HAMR system is shown, the various embodiments described may be used in other EAMR or non-EAMR magnetic data recording systems, including perpendicular magnetic recording (PMR) disk drives or magnetic tape drives.

Figure 1B:
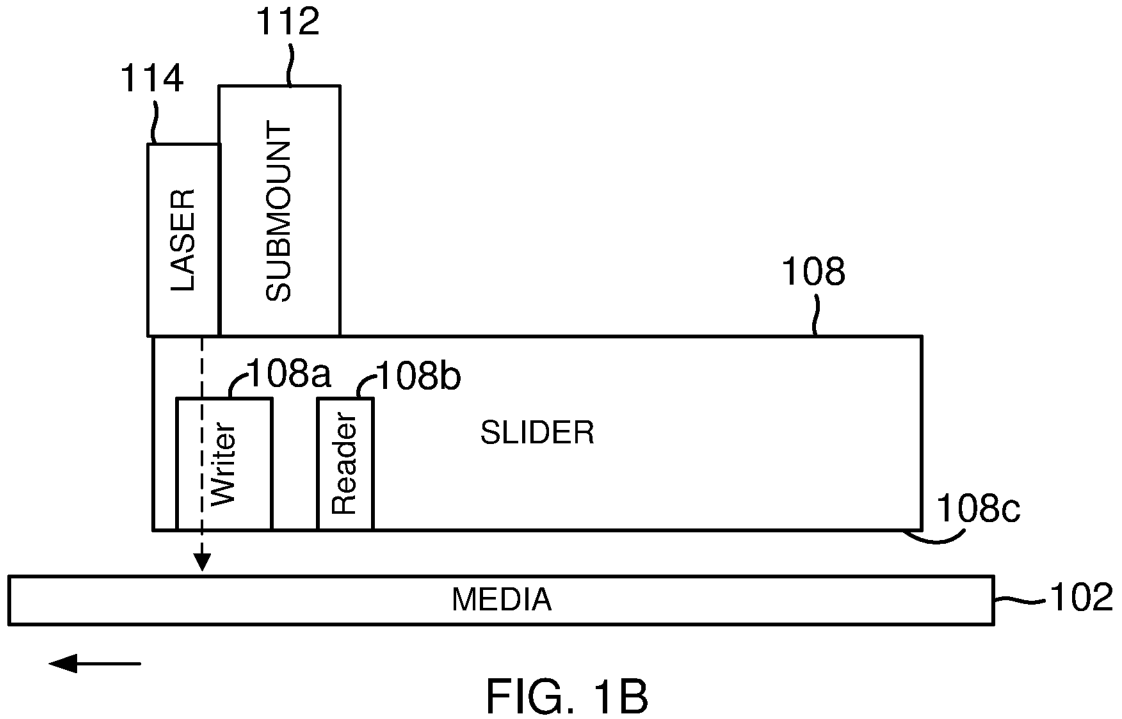
FIG. 1B is a side schematic view of the slider and magnetic recording medium of FIG. 1A in accordance with one aspect of the disclosure.

FIG. 1B is a side schematic view of the slider 108 and magnetic recording medium 102 of FIG. 1A. The magnetic recording medium 102 includes a lubricant layer (see FIG. 2) in accordance with one or more aspects of the disclosure. The slider 108 may include a sub-mount 112 attached to a top surface of the slider 108. The laser 114 may be attached to the sub-mount 112, and possibly to the slider 108. The slider 108 includes a write element (e.g., writer) 108*a* and a read element (e.g., reader) 108*b* positioned along an air bearing surface (ABS) 108*c* of the slider for writing information to, and reading information from, respectively, the medium 102. In other aspects, the slider may also include a layer of the lubricant (not shown).

In operation, the laser 114 is configured to generate and direct light energy to a waveguide (possibly along the dashed line) in the slider which directs the light to a Near Field Transducer (NFT) near the air bearing surface (e.g., bottom surface) 108*c* of the slider 108. Upon receiving the light from the laser 114 via the waveguide, the NFT generates localized heat energy that heats a portion of the medium 102 near the write element 108*a* and the read element 108*b*. The anticipated recording temperature is in the range of about 350° C. to 400° C. In the aspect illustrated in FIG. 1B, the laser directed light is disposed between the writer 108*a* and a trailing edge of the slider. In other aspects, the laser directed light may instead be positioned between the writer 108*a* and the reader 108*b*. FIGS. 1A and 1B illustrate a specific aspect of a HAMR system. In other aspects, the magnetic recording medium 102 with the lubricant layer according to aspects of the disclosure can be used in other suitable HAMR systems (e.g., with other sliders configured for HAMR).

Figure 2:
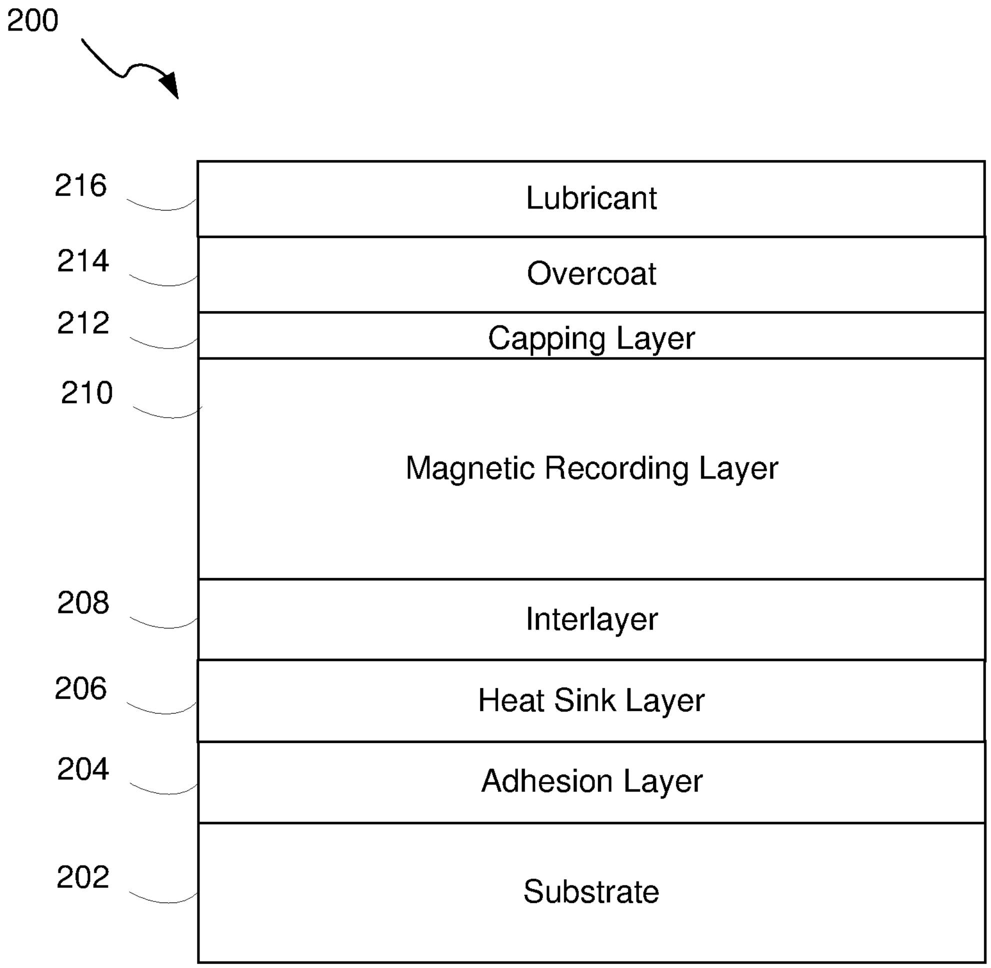
FIG. 2 is a side schematic view of a HAMR medium in accordance with one aspect of the disclosure.

FIG. 2 is a side schematic view of a magnetic recording medium 200 having a lubricant layer according to one or more aspects of the disclosure. In one aspect, the magnetic recording medium 200 may be used in a HAMR system (e.g., disk drive 100). The magnetic recording medium 200 has a stacked structure with a substrate 202 at a bottom/base layer, an adhesion layer 204 on the substrate 202, a heat sink layer 206 on the adhesion layer 204, an interlayer 208 on the heat sink layer 206, a Magnetic Recording Layer (MRL) 210 on the interlayer 208, a capping layer 212 on the MRL 210, an overcoat layer 214 on the capping layer 212, and a lubricant layer 216 on the overcoat layer 214. In one aspect, the magnetic recording medium 200 may have a Soft Magnetic Underlayer (SUL) between the adhesion layer 204 and the heat sink layer 206. In one aspect, the magnetic recording medium 200 may have a Thermal Resistance Layer (TRL) between the interlayer 208 and the heat sink layer 206. In one aspect, for disk drive applications, the substrate 202 can be made of one or more materials such as an Al alloy, NiP plated Al, glass, glass ceramic, and/or combinations thereof. In one aspect for magnetic tape recording applications, the substrate 202 can include a flexible material, such a film made of one of various types of resins, polyesters, polyolefins, polyamides, and the like, or combinations thereof. The substrate may include non-magnetic materials, and may be laminated. In some aspects, the magnetic recording medium 200 may have some or all of the layers illustrated in FIG. 2 and/or additional layer(s) in various stacking orders. It should also be noted that each layer shown in FIG. 2 may include one or more sub-layers. For example, the magnetic recording layer may comprise a multiple layers in certain embodiments. Also, some of the layers may be etched before the next layer is applied.

Lubricants

Lubricants according to aspects disclosed herein may function as boundary lubricants which may be used in various mechanical devices, including on the magnetic media of hard disk drives or tape drives and in conjunction with other microelectronic mechanical systems. Boundary lubricants may form a lubricant layer when one or more functional groups of the lubricant attach or otherwise engage with the surface being lubricated. For instance, one or more boundary lubricants may form the lubricant layer 216 on magnetic recording medium 200 (e.g., a disk that includes a magnetic recording layer 210) that moves relative to other parts in the magnetic storage device. This lubricant layer 216 may help to protect the magnetic recording medium from friction, wear, contaminations, smearing, and/or damages caused by interactions between the magnetic recording medium and other parts in the storage device (e.g., interactions between a slider and the magnetic recording medium). In other words, this boundary layer may help limit solid-to-solid contact.

While the HDD examples illustrated in FIGS. 1A, 1B, and 2 primarily relate to HAMR technology that involves the use of lubricants, the lubricants described herein may also be used in other magnetic recording technologies. These may include Microwave Assisted Magnetic Recording (MAMR), Perpendicular Magnetic Recording (PMR), Enterprise Perpendicular Magnetic Recording (ePMR), Shingled Magnetic Recording (SMR), or any other magnetic recording technology employing lubricants on magnetic media (e.g., magnetic recording disks or magnetic recording tape).

Lubricant Characteristics

Figure 3A:
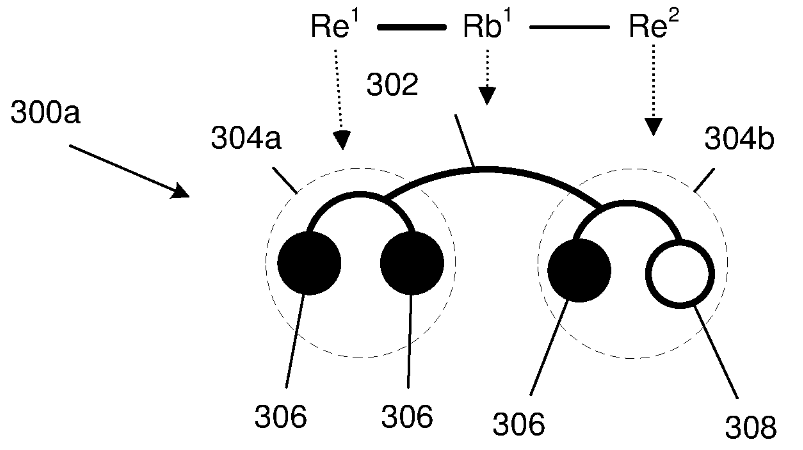
FIG. 3A is a schematic drawing showing a lubricant according to general Formula (II) of the disclosure comprising a single main chain segment and a cyclic functional group in accordance with one aspect of the disclosure.

FIGS. 3A-3D illustrate boundary lubricants according to aspects of the disclosure. In one aspect as shown in FIG. 3A, the boundary lubricant generally referred to as 300*a* comprises or may have general Formula (II):

$$Re^1—Rb^1—Re^2; \quad \text{(II)}$$

wherein $Rb^1$ (302) comprises or is a chain segment including an alkyl, alkenyl, fluoroalkyl, fluoroalkenyl, perfluoroalkyl, or perfluoroalkyl ether moiety bonded on either side to an end segment 304*a* and 304*b*. $Rb^1$ may be non-fluorinated, contain anchoring functional groups and contain aromatic, e.g., benzene, rings. $Rb^1$ may also have a stiffening component that has a higher rotational energy than $CH_2$. In the aspect shown in FIG. 3A, the chain segment $Rb^1$ (302) may also be referred to as a main chain segment. Each of $Re^1$ (304*a*) and $Re^2$ (304*b*) is an end segment which independently includes an anchoring functional group 306 selected for being attachable to and/or engageable with a protective overcoat of a magnetic recording medium (see FIG. 2).

Figure 3B:
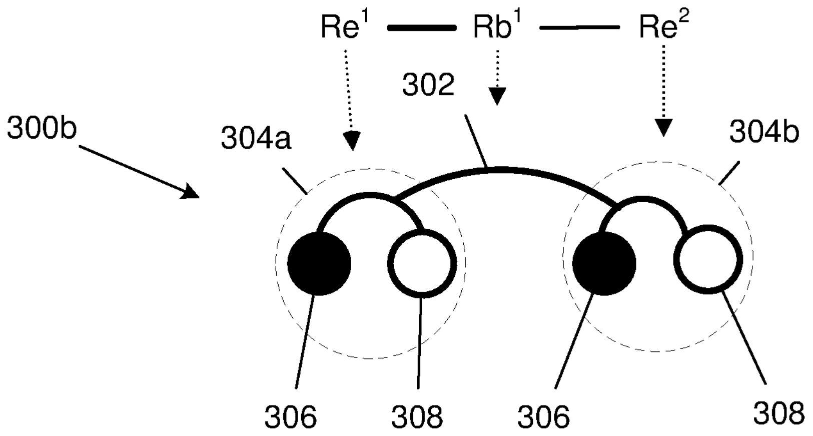
FIG. 3B is a schematic drawing showing a lubricant according to general Formula (II) of the disclosure comprising a single main chain segment and a multitude of cyclic functional groups in accordance with one aspect of the disclosure.

As shown in FIG. 3B, in one aspect indicated as 300*b*, each end group segment may include a functional group 308 that can be as simple as an —OH group.

Figure 3C:
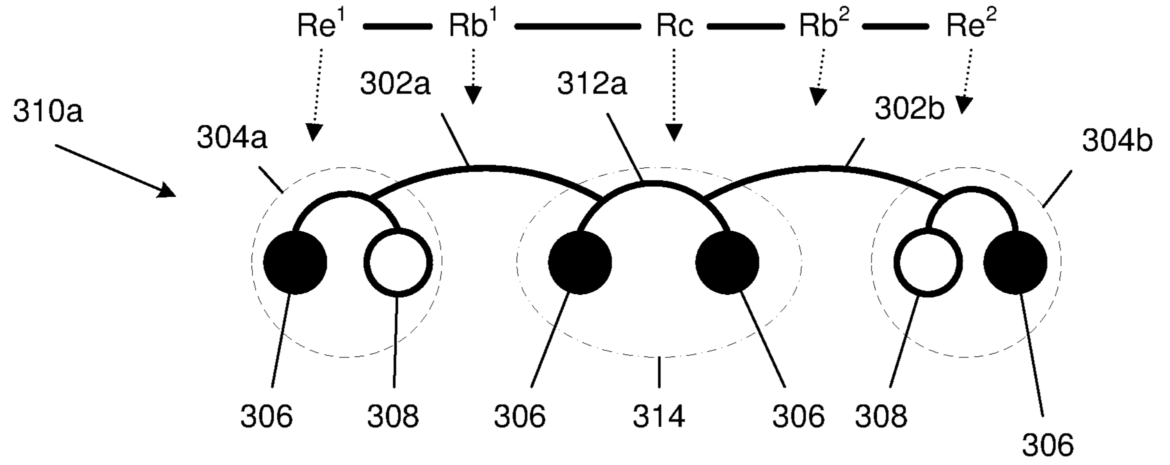
FIG. 3C is a schematic drawing showing a lubricant according to general Formula (III) of the disclosure comprising two chain segments comprising terminal cyclic functional groups and separated by a linking segment in accordance with one aspect of the disclosure.

In one aspect as shown in FIG. 3C, the boundary lubricant generally referred to as 310*a* may comprise or has general Formula (III):

$$Re^1—Rb^1—Rc—Rb^2—Re^2; \quad \text{(III)}$$

where the end segments $Re^1$ (304*a*) and $Re^2$ (304*b*) are as described above; in this aspect there are two chain segments $Rb^1$ (302*a*) and $Rb^2$ (302*b*), which may also be referred to herein as sidechain segments, both of which independently comprises a fluoroalkyl, fluoroalkenyl, perfluoroalkyl, or perfluoroalkyl ether moiety.

As is indicated in FIG. 3C, whether referred to as a chain segment, a main chain segment (when only one is present), or a sidechain segment (when two or more are present), each of the segments are similar to one another in that each segment comprises an alkyl, alkenyl, fluoroalkyl, fluoroalkenyl, perfluoroalkyl, or perfluoroalkyl ether moiety.

In the aspect shown in FIG. 3C, the lubricant may further include a divalent linking segment Rc (312), generally indicated as 314, also referred to herein as a center segment, which is disposed between either end of the sidechain segments 302*a* and 302*b*, and which includes at least one anchoring functional group (306) as defined herein, as well as at least one group that has a higher rotational energy than $CH_2$, which for example can be an aromatic group, e.g., benzene. In an embodiment, Rc is non-fluorinated. The divalent linking segment optionally includes aromatic moieties which act to stiffen the center of the molecule. The aromatic moieties, e.g., benzene, impact both the chain stiffness and solubility differently than fluorination.

Figure 3D:
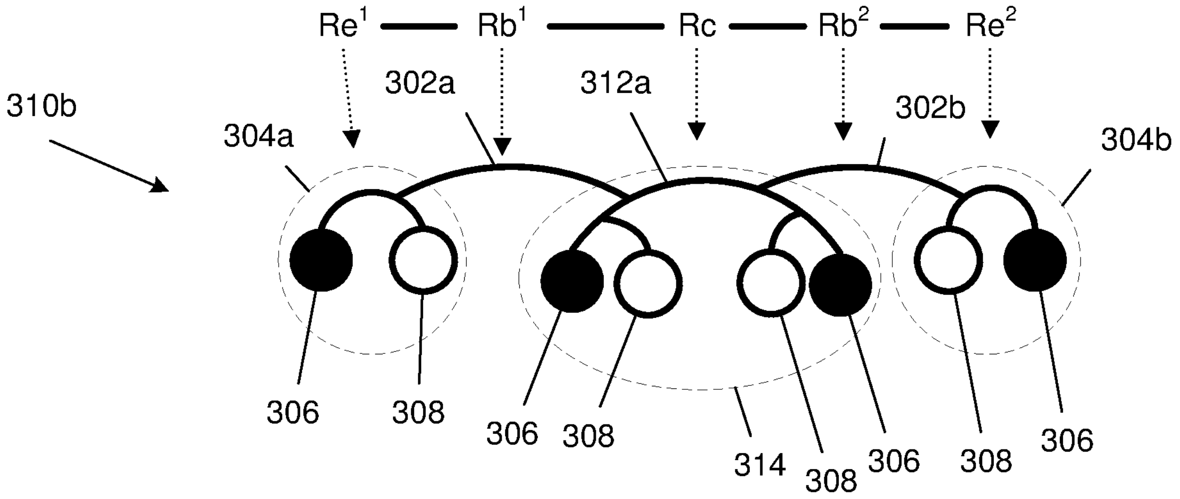
FIG. 3D is a schematic drawing showing a lubricant according to general Formula (III) of the disclosure comprising two chain segments comprising terminal cyclic functional groups and separated by a linking segment comprising cyclic functional groups in accordance with one aspect of the disclosure.

As shown in FIG. 3D, in one aspect generally indicated as 310*b*, the divalent linking segment Rc (312) may further include at least one functional group 308 as defined herein.

Figure 3E:
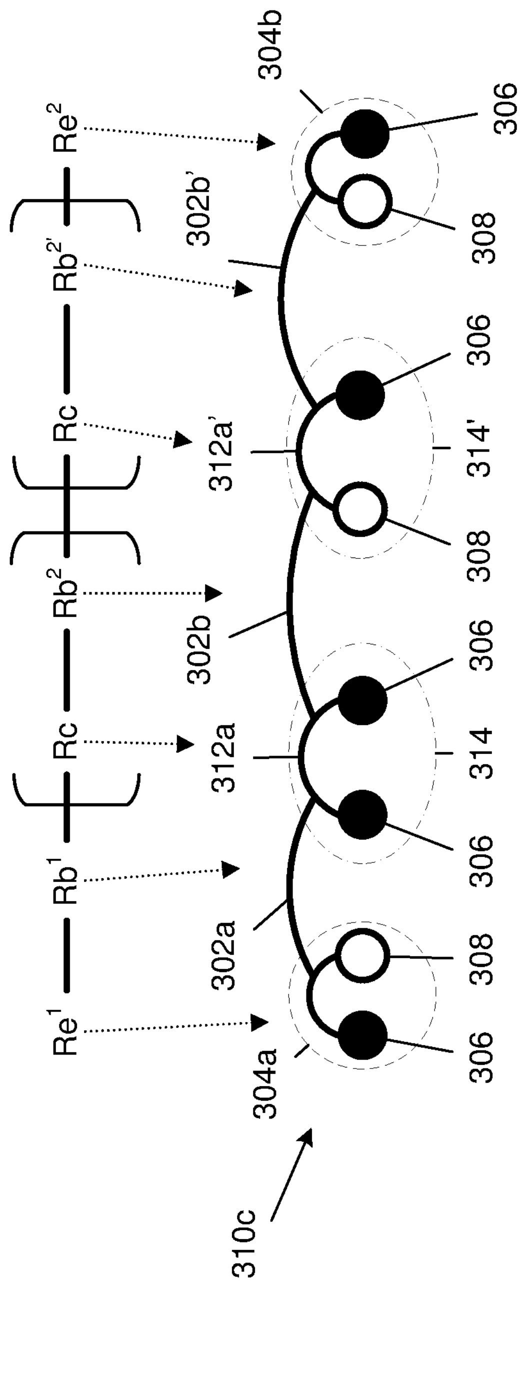
FIG. 3E is a schematic drawing showing a lubricant according to general Formula (IV) of the disclosure comprising two chain segments comprising terminal cyclic functional groups and separated by a linking segment in accordance with one aspect of the disclosure.

In one aspect as shown in FIG. 3E, the boundary lubricant generally referred to as 310*c* may comprise or has general Formula (IV):

$$Re^1—Rb^1—(Rc—Rb^2)_m—Re^2; \quad \text{(IV)}$$

where m=2, comprising two units of the divalent linking segments, each containing an aromatic moiety or a moiety that has a higher rotational energy than $CH_2$; a first unit comprising Rc (312*a*) also generally indicated as (314), attached to a chain segments $Rb^2$ (302*b*), which is attached to a second unit comprising Rc (312*a*') also generally indicated as (314') and a second chain segment $Rb^{2'}$ (302*b*'). The second unit includes a moiety that has a rotational energy barrier that is greater than that of $CH_2$. The end segments $Re^1$ (304*a*) and $Re^2$ (304*b*) are attached to either end of the molecule. The composition of each of the segments may be independent of one another. The composition of each of the segments is according to the description of general Formula (I) herein. In an embodiment, Rc contains at least one anchoring functional group, is non-fluorinated and contains at least one aromatic constituent, e.g., a benzene ring. In an embodiment, Rc contains two aromatic constituents.

In one aspect, each anchoring functional group may independently comprises a B, Si, pnictogen, chalcogen, or halogen, $—OR^*$, $—NR^*_2$, $—NR^*—CO—R^*$, $—OR^*$, $—O—CO—R^*$, $—CO—O—R^*$, $—SeR^*$, $—TeR^*$, P(III) groups including $—PR^*_2$, $—PO—(OR^*)_2$ and $—O—PO—(OR^*)_2$, $—N{=}P(NR^*_2)_3$, $—AsR^*_2$, $—SR^*$, $—SO_2—(OR^*)_2$, $—BR^*_2$, $—SiR^*_3$, $—(CH_2)_q—SiR^*_3$, $—(CF_2)_q—SiR^*_3$, or a combination thereof, wherein q is 1 to 10 and each R* is, independently a hydrogen, a pnictogen/chalcogen/halogen, or a saturated, unsaturated, aromatic, polycyclic aromatic, heteroaromatic, alicyclic, and/or heterocyclic $C_1$-$C_{50}$ radical, and two or more R* may join together to form a ring structure. Frequently, the anchoring functional group may be hydroxyl (—OH).

In one aspect, each cyclic functional group may further comprise, e.g., may be further substituted with a functional group comprising at least one of a B, Si, pnictogen, chalcogen, or halogen, —OH, $—NH_2$, —NH—CO—H, —OH, —O—CO—H, —CO—O—H, —SeH, —TeH, $—PH_2$, $—PO—(OH)_2$, $—O—PO—(OH)_2$, $—N{=}P(NH_2)_3$, $—AsH_2$, —SH, $—SO_2—(OH)_2$, $—BH_2$, $—SiH_3$, $—(CH_2)_q—SiH_3$, $—(CF_2)_q—SiH_3$, or a combination thereof, wherein q is 1 to 10.

In one aspect, one or more anchoring functional group may include, or is, a hydroxyl (—OH) moiety. In one aspect, each anchoring functional group includes or is a hydroxyl (—OH) moiety. In some aspects, one or more cyclic functional groups may comprise a hydroxyl (—OH) moiety. In some aspects, each cyclic functional group comprises a hydroxyl (—OH) moiety.

Main-Chain Functional Groups

Applicants have discovered that the presence of functional groups having high rotational energy barriers, e.g., aromatic functional groups, in the main-chain of the molecule provide a multifaceted benefit for applications involving higher operational temperatures (e.g., such as HAMR media applications) when the aromatic functional groups are present in the center or linking segment pendant to the chain segments according to aspects disclosed herein. It has been discovered that the aromatic functional groups reduce the contamination present on the magnetic recording medium when operating at high temperatures. The disclosure is not restricted to aromatic groups, and any group that has a higher rotational energy than $CF_2$ will also achieve the molecular stiffening that enhances high temperature performance.

In one aspect, a cyclic aromatic functional group may include substituted or unsubstituted analogs of borirene, cyclopropenone, furan, pyrrole, imidazole, thiophene, phosphole, pyrazole, oxazole, isoxazole, thiazole, triazole, tetrazole, pentazole, benzene, pyridine, pyrazine, pyrimidine, pyridazine, triazine, tetrazine, pentazine, hexazine, borepin, tropone, azonine, cyclooctadecanonaene, diazapentalene, thienothiophene, trithiapentalene, benzofuran, isobenzofuran, indole, isoindole, benzothiophene, benzo(c)thiophene, benzophosphole, benzimidazole, purine, indazole, benzoxazole, benzisoxazole, benzothiazole, 5-aza-7-deazapurine, naphthalene, quinoline, isoquinoline, quinoxaline, quinazoline, cinnoline, phthalazine, azulene, combinations thereof, and/or the like. According to aspects of the disclosure, the aromatic group may be anisole, benzene, naphthalene, anthracene, phenanthrene, dibenz[a,h,]anthracene, pyrene or benzopyrene.

Molecular Design

The present disclosure pertains to a general conceptual strategy for modification of the main-chain repeat unit. The goal is to be able to modify a single part of the repeat unit that can allow for tailoring the performance of the lubricant to a specification. Examples show how the concept can be utilized to modify the main-chain repeat unit. The disclosure provides synthesis pathways to achieve these novel repeating unit structures.

Figure 4A:
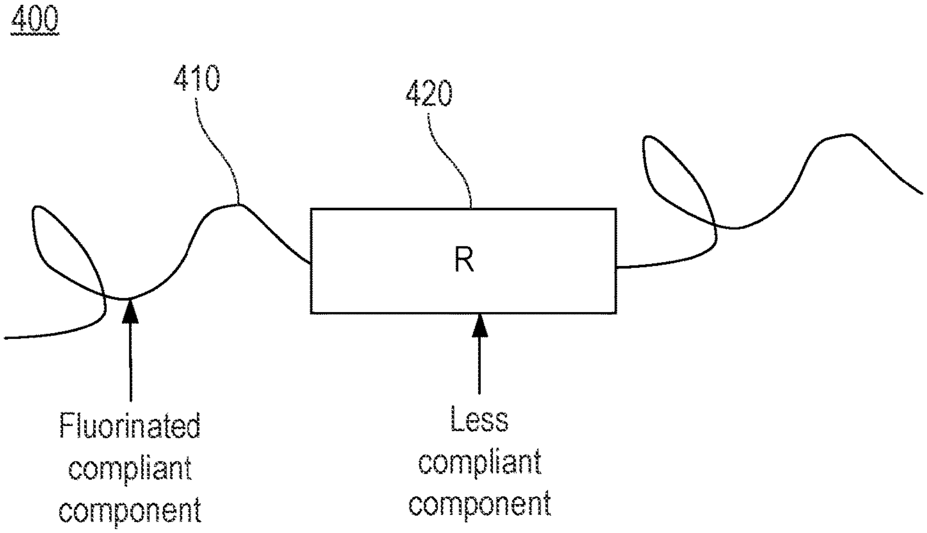
FIG. 4A shows the general concept of the redesigned repeating unit of a lubricant molecule in accordance with one aspect of the disclosure.

FIG. 4A shows the general concept of the redesigned repeating unit of the lubricant molecule in accordance with one aspect of the disclosure. The repeating unit 400 includes a fluorinated compliant component 410 and a less compliant component 420. The less compliant component has a higher rotational energy barrier than that of the fluorinated compliant component. The less compliant component is generally stiffer. i.e., more rigid, than the fluorinated compliant component.

Figure 4B:
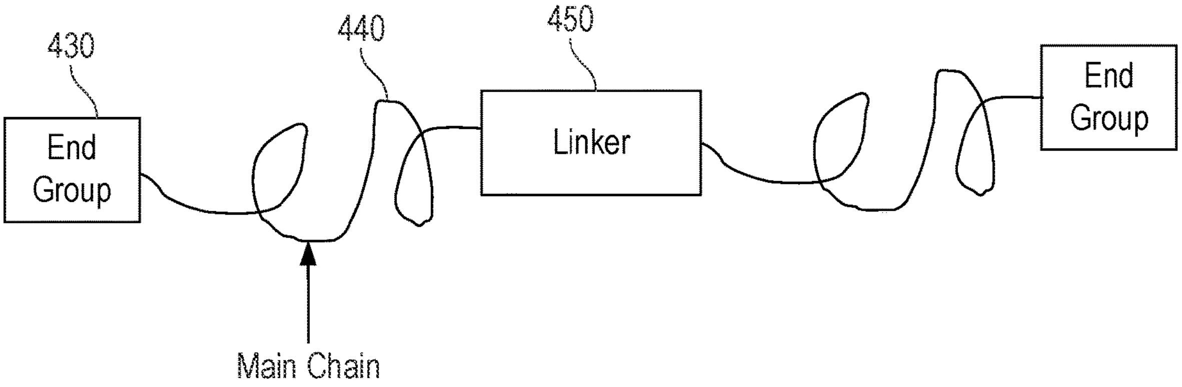
FIG. 4B shows the general design of the lubricant molecule in accordance with one aspect of the disclosure.

FIG. 4B shows the general design of the lubricant molecule in accordance with one aspect of the disclosure. The lubricant molecule is composed of three main components: the end group 430, the main chain 440 and the linker 450. All three components contribute to the performance of the lubricant.

Figure 5:
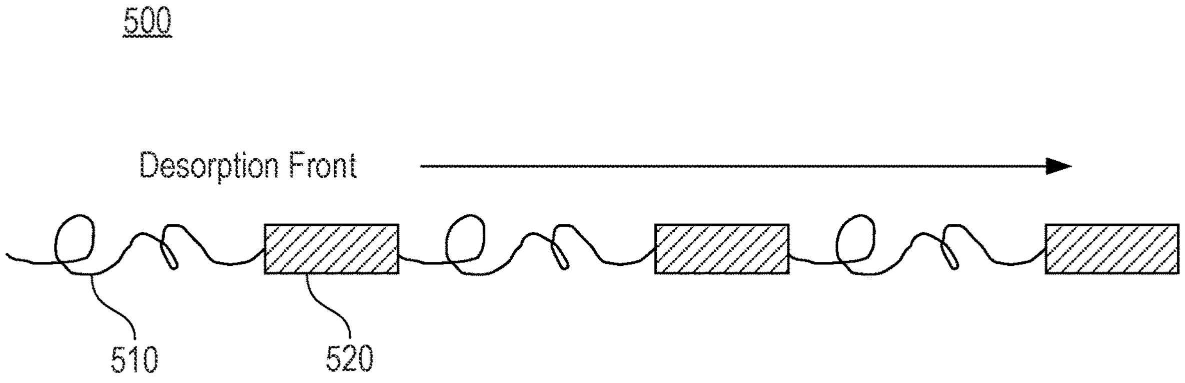
FIG. 5 shows the thermal desorption of a lubricant molecule in accordance with one aspect of the disclosure.

FIG. 5 shows the thermal desorption of a lubricant molecule in accordance with one aspect of the disclosure. As is shown in FIG. 5, thermal desorption of a molecule 500 is driven by the sequential desorption of adjacent molecular components 510, 520, analogous to crack propagation in solid materials. By incorporating rigid components 520 into the main-chain component of the lubricant the "crack propagation" of desorption can be blunted/slowed, resulting in increased evaporation temperature.

Modification of the main chain repeat unit will increase the evaporation temperature and tailor other properties as well. An aromatic molecule can serve as the less compliant component, as is shown below.

Formula (V)

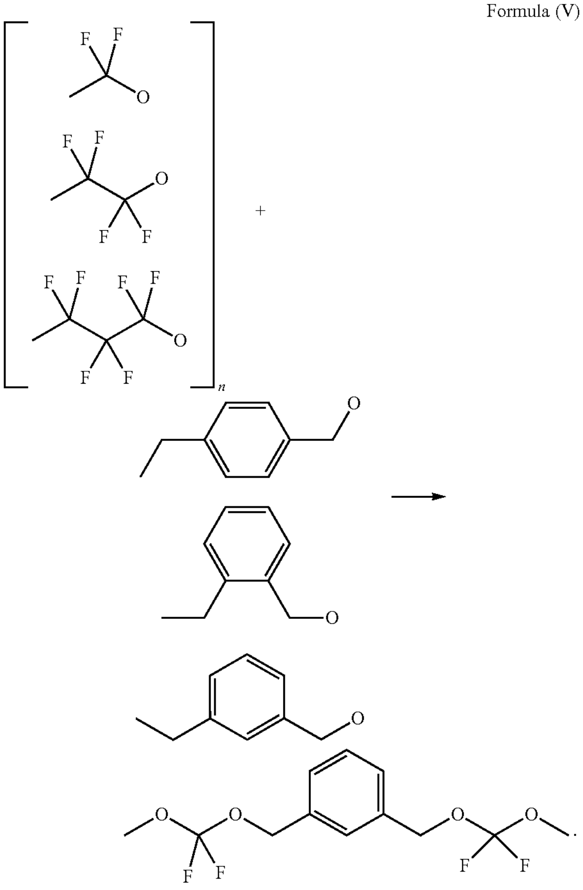

Ortho and para isomers can also be obtained:

Formula (VI)

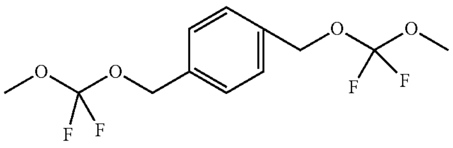

para

Formula (VII)

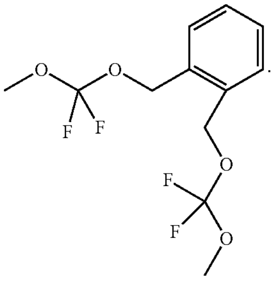

ortho

That is, the benzene component can have different connections:

(i)

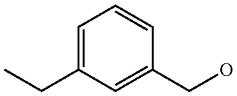

(ii)

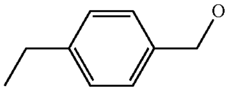

(iii)

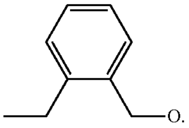

The aromatic component can also be fluorinated to decrease the surface energy of the lubricant and to help with solubility:

(iv)

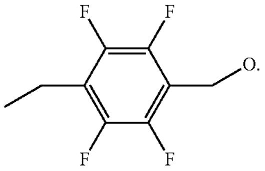

In the disclosure, the aromatic component can be anisole, benzene, naphthalene, anthracene, phenanthrene, dibenz[a, h]anthracene, pyrene, catechol or benzopyrene.

The main chain is not restricted to aromatic moieties to achieve a rotational energy barrier greater than $CF_2$. This can be achieved via substituted carbon or nitrogen moieties:

(v)

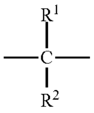

where $R^1$ and $R^2$ are each independently fluorinated or nonfluorinated $C_1$ to $C_{10}$ alkyl which may also include ether and carbonyl linkages, or (vi)

where $R^3$ is fluorinated or nonfluorinated $C_1$ to $C_{10}$ alkyl which may also include ether and carbonyl linkages.

Other aromatics can also be used, including naphthalene, anthracene, phenanthrene, etc. For example, consider some of the isomers of naphthalene:

Formula (VIII)

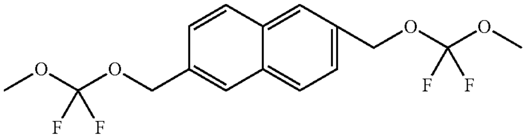

Formula (IX)

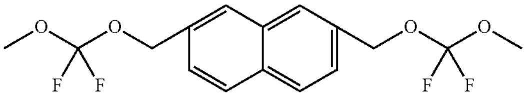

Formula (X)

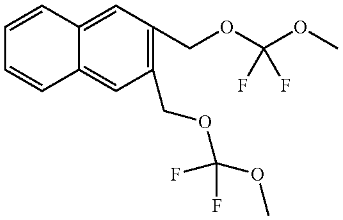

Formula (XI)

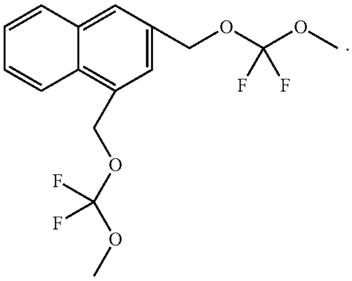

The naphthalene aromatic can also be fluorinated to decrease the surface energy of the lubricant and to increase solubility.

The triple ring of phenanthrene has ten sites for substitution, and some of the configurations are shown below:

Formula (XII)

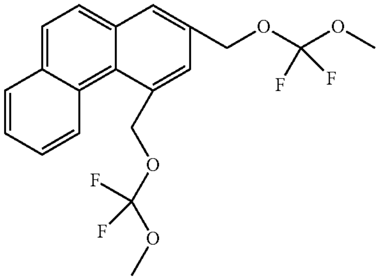

Formula (XIII)

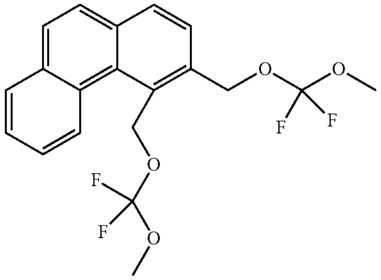

-continued

Formula (XIV)

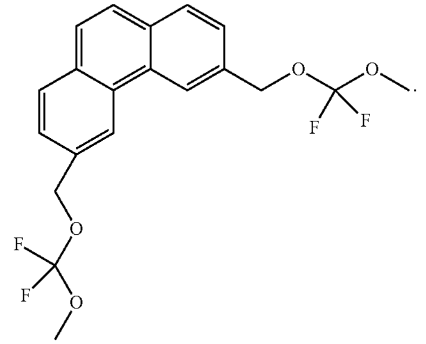

In the disclosure, increasing the stiffness of the main-chain reduces the lube loss off the disk surface at elevated temperatures.

Figure 6:
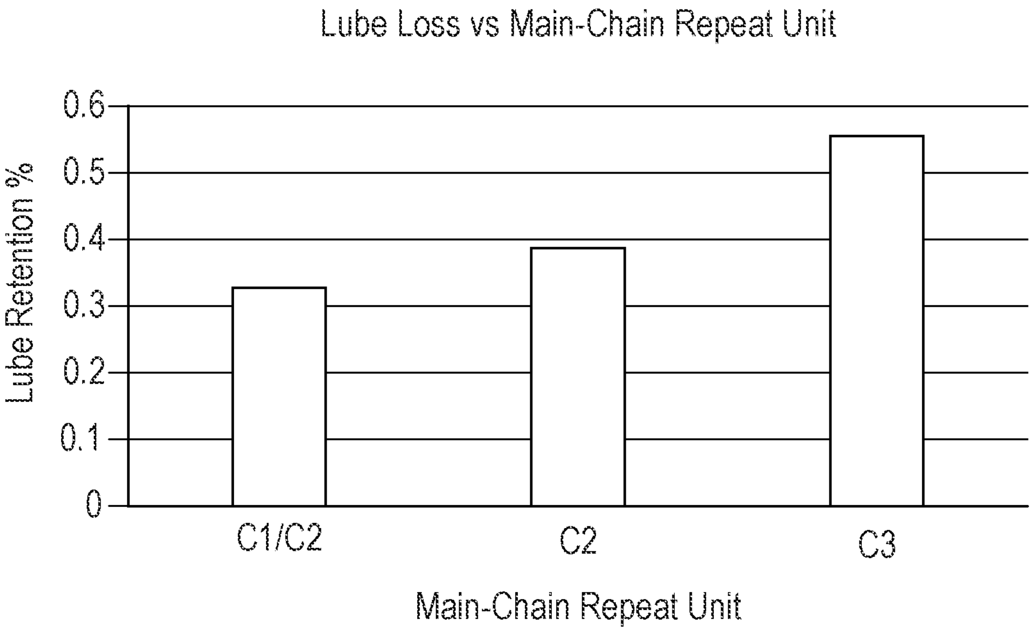
FIG. 6 is a chart showing lube loss as a function of a main chain repeating unit in accordance with one aspect of the disclosure.

FIG. 6 is a chart showing lube loss as a function of a main chain repeating unit in accordance with one aspect of the disclosure. For example, as shown in FIG. 6 by increasing the number of $CF_2$ repeat units from a mixture of 1 and 2, to purely 2, and to purely 3 on sees an increase in the lube retention by 6% from C1/C2 to C2, and another 17% from C2 to C3.

Higher evaporation temperatures are expected when an aromatic moiety such as benzene is incorporated into the main chain, as in Formula (XV):

Formula (XV)

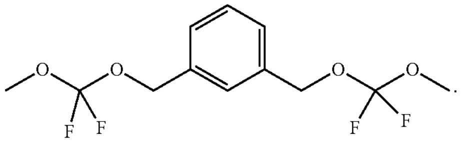

The different connecting points on the aromatic molecule fine tune the properties, as well as optimize the properties. Reacting different lengths of fluorinated segments with the benzene-containing component fine tunes the structure of the main chain. An example is the dehydration reaction of two alcohols:

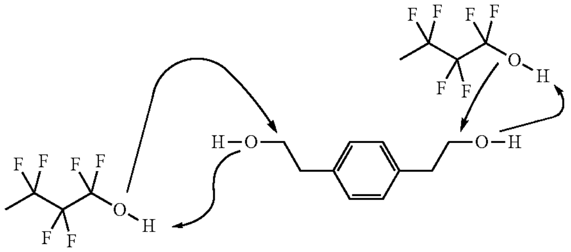

Formula (XVI)

-continued

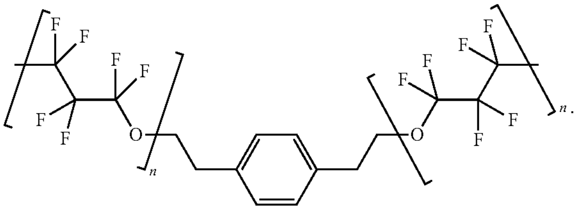

Formula (XVII)

In the disclosure, the aromatic group can be substituted by Friedel Krafts alkylation using a chlorinated component in the presence of $AlCl_3$ to yield an aromatic group substituted with at least one of $-C_nH_{n+1}$ or $-(C{=}O)-C_nH_{n+1}$ where n is from 1 to 6. Typical examples are shown below:

Formula (XVIII)

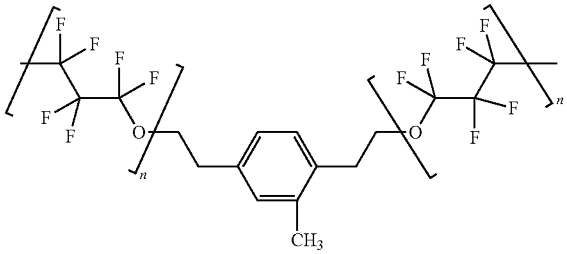

Formula (XIX)

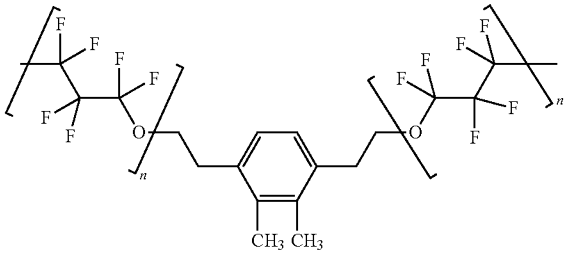

Formula (XX)

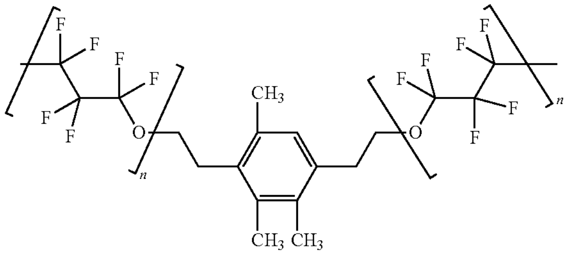

Formula (XXI)

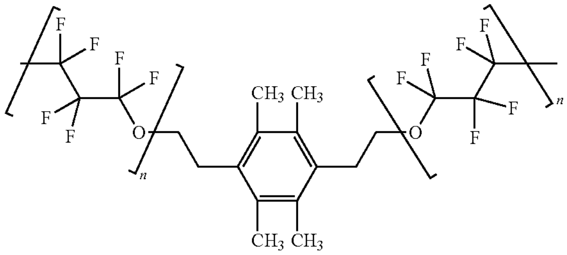

-continued

Formula (XXII)

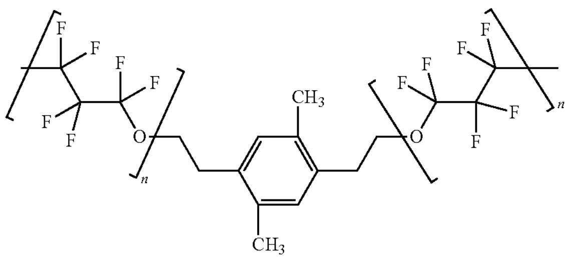

Formula (XXIII)

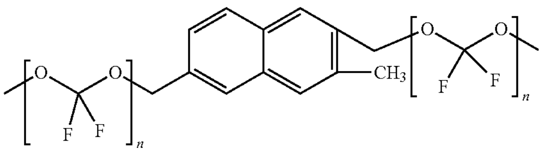

Formula (XXIV)

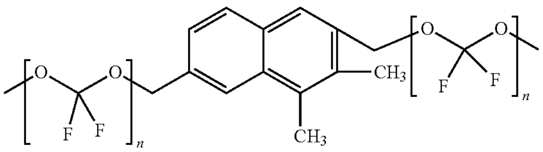

Formula (XXV)

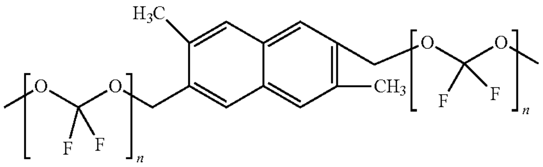

The substitutions on the aromatic moiety are not restricted to alkyl substituents such as methyl. Halide substituted alkyl substituents, e.g., $—CF_3$, $—CF_2CF_3$, $CCl_3$, etc., can be used. Also, a halide such as Cl, Br, I or F can be directly substituted on the aromatic moiety.

Many of the structures of the disclosure can be summarized by the general Formula (I):

$$Rc—((Rb)_m—Re)_n \quad (I)$$

wherein Rc is a multivalent central group, Rb is a main chain group having a constituent with a higher rotational energy threshold than $CF_2$, Re is an end group having at least one anchoring functional group, m is from 2 to 50, and n is from 2 to 8.

When the central group is divalent, the lubricant comprises or is of the general Formula (Ia):

$$Re^1—Rb^1{}_m—Rc—Rb^2{}_n—Re^2 \quad (Ia)$$

where Rc is a divalent central group, $Rb^1$ and $Rb^2$ each independently are a main chain group having a constituent with a higher rotational energy threshold than $CF_2$, $Re^1$ and $Re^2$ are each independently an end group having at least one anchoring functional group, and m and n are each independently from 2 to 50.

Divalent Linking Segment (Rc)

In one aspect of the disclosure, the linking segment Rc of Formula (I) can be divalent, as in Formula (Ia), and the divalent linking or center segment Re may further includes one or more anchoring functional groups, and/or one or more aromatic functional groups or groups having high rotational energy barriers. The divalent Rc linking segment may be of the general Formula (XXVI) or (XXVII):

Formula (XXVI)

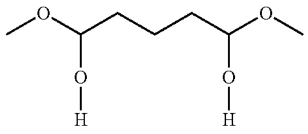

Formula (XXVII)

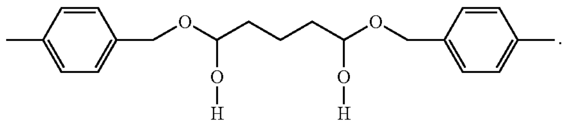

The general formulas (XXVI) and (XXVII) optionally contain no fluorine. The benzene rings have a higher rotational energy barrier than $—CF_2—$ and thus add stiffness an increased temperature resistance to the molecule. The benzene ring can be substituted with any moiety that has a higher rotational energy barrier than $—CF_2—$ and can even be a fluorinated species. In a related aspect, at least one aromatic moiety present on the linking segment Re may not be benzene, but may be may be an aromatic functional group including an aromatic $C_5$-$C_{50}$ radical.

In another aspect, $—Re^1$-Rc-$Re^2—$ includes or is of general Formula (XXVIII) or (XXIX):

Formula (XXVIII)

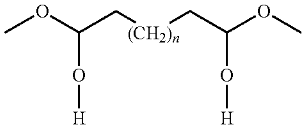

Formula (XXIX)

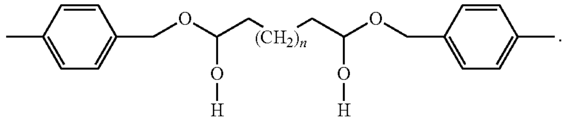

where n is from 1 to 10. The general Formulas (XXVIII) and (XXIX) optionally contain no fluorine. The benzene rings have a higher rotational energy barrier than $—CF_2—$ and thus add stiffness and increased temperature resistance to the molecule. The benzene ring can be substituted with any moiety that has a higher rotational energy barrier than $—CF_2—$ and can even be a fluorinated species. In a related aspect, at least one aromatic moiety present on the linking segment Re may not be benzene, but may be may be an aromatic functional group including an aromatic $C_5$-$C_{50}$ radical.

In another aspect, Rc includes or is of general Formula (XXX):

Formula (XXX)

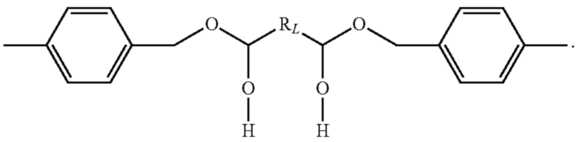

where $R_L$, if present, is $C_nM_{n+2}$, where M is H or F, and n is from 1 to 10. In the general Formula (XXX), the benzene rings are optional or can be replaced by naphthalene, phenanthrene or anthracene.

The molecular design is based on the observation that a redesigned main-chain with the inclusion of an constituents with a higher rotational energy threshold than $CF_2$, such as an aromatic moiety, e.g., a benzene ring, improves the dip coating uniformity relative to the fluorinated versions and substantially increases the evaporation temperature.

End Segment ($Re^1$, $Re^2$)

In one aspect of the disclosure, each end segment Re may independently include or may have general Formula (XXXI):

Formula (XXXI)

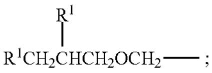

wherein at least one $R^1$ is an anchoring functional group attachable to and/or engageable with a protective overcoat of a magnetic recording medium, comprising: a B, Si, pnictogen, chalcogen, or halogen, —OR*, —$NR^*_2$, —NR*—CO—R*, —OR*, —O—CO—R*, —CO—O—R*, —SeR*, —TeR*, —$PR^*_2$, P(III) groups including —PO—$(OR^*)_2$, and —O—PO—$(OR^*)_2$, —N═$P(NR^*_2)_3$, —$AsR^*_2$, —SR*, —$SO_2$—$(OR^*)_2$, —$BR^*_2$, —$SiR^*_3$, —$(CH_2)_q$—$SiR^*_3$, —$(CF_2)_q$—$SiR^*_3$, or a combination thereof, wherein q is 1 to 10 and each R* is, independently a hydrogen, a pnictogen/chalcogen/halogen, or a saturated, unsaturated, aromatic, polycyclic aromatic, heteroaromatic, alicyclic, and/or a heterocyclic $C_1$-$C_{50}$ radical, and two or more R* may join together to form a ring structure. In one aspect, each end segment $Re^1$ and $Re^2$ may independently include at least one $R^1$ which may be a cyclic functional group which may include an alicyclic $C_3$-$C_{50}$ alkyl radical, an alicyclic $C_3$-$C_{50}$ alkenyl radical, a heterocyclic $C_3$-$C_{50}$ radical, an aromatic $C_5$-$C_{50}$ radical, a polycyclic aromatic $C_{10}$-$C_{50}$ radical, a heteroaromatic $C_5$-$C_{50}$ radical, a cyclotriphosphazine radical, or a combination thereof, which may be further substituted with a functional group as disclosed herein. Anchoring functional groups can also include OH, —$NH_2$, —NH—CO—H, —OH, —O—CO—H, —CO—O—H, —SeH, —TeH, P(III) groups including —$PH_2$, —PO—$(OH)_2$ and —O—PO—$(OH)_2$, —N═$P(NH_2)_3$, —$AsH_2$, —SH, —$SO_2$—$(OH)_2$, —$BH_2$, —$SiH_3$, —$(CH_2)_q$—$SiH_3$, —$(CF_2)_q$—$SiH_3$, or a combination thereof, wherein q is 1 to 10.

In one aspect, one or more anchoring functional group may include, or is, a hydroxyl (—OH) moiety. In some aspects, each anchoring functional group includes a hydroxyl (—OH) moiety.

In another aspect, the anchoring functional group can contain an aromatic moiety, e.g., benzene:

Formula (XXXII)

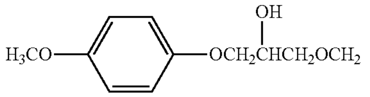

or

Formula (XXXIII)

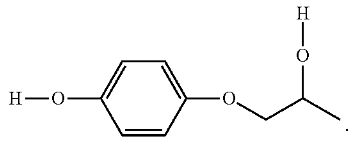

The aromatic group is not limited to benzene, but any aromatic group can be incorporated, e.g., anisole, benzene, naphthalene, anthracene, phenanthrene, dibenz[a,h]anthracene, pyrene, catechol or benzopyrene.

In one or more aspects, the lubricants are stable above about 250° C., or above about 300° C., or above about 325° C., or above about 350° C., or above about 375° C., and less than or equal to about 450° C., or 425° C. when determined in air, nitrogen, helium, or 90 vol % helium/10 vol % oxygen.

In one or more aspects, the lubricant has a weight average molecular weight of greater than or equal to about 0.5 kiloDalton (kDa), or from about 1 to about 20 kDa, or from about 2 to about 10 kDa, or from about 3 to about 7 kDa, or from about 1 to about 5 kDa, or 2 to about 4 kDa.

In one or more aspects, the lubricant has a weight average molecular weight of greater than or equal to about 500 grams per mole (g/mol), or from about 1,000 to about 20,000 g/mol, or from about 2,000 to about 10,000 g/mol, or from about 3,000 to about 7,000 g/mol, or from about 1,000 to about 5,000 g/mol, or 2,000 to about 4,000 g/mol.

In one or more aspects, the lubricants are essentially pure compounds, having a polydispersity, defined as the number average molecular weight Mn divided by the weight average molecular weight Mw (Mn/Mw) from about 1 to 2, or from about 1 to about 1.5, or from about 1 to about 1.1, or from about 1 to about 1.05.

In the disclosure at least one anchoring functional group comprises at least one of B, Si, a pnictogen, a chalcogen, a halogen, —OR*, —$NR^*_2$, —NR*—CO—R*, —O—CO—R*, —CO—O—R*, —SeR*, —TeR*, P(III) groups including —$PR^*_2$, —PO—$(OR^*)_2$ and —O—PO—$(OR^*)_2$, —N═$P(NR^*_2)_3$, —$AsR^*_2$, —SR*, —$SO_2$—$(OR^*)_2$, —$BR^*_2$, —$SiR^*_3$, —$(CH_2)_q$—$SiR^*_3$, —$(CF_2)_q$—$SiR^*_3$, or a combination thereof, wherein q is 1 to 10 and each R* is, independently, a hydrogen, B, Si, a pnictogen, a chalcogen, a halogen, a saturated $C_1$-$C_{50}$ radical, an unsaturated $C_2$-$C_{50}$ radical, an aromatic $C_4$-$C_{50}$ radical, a polycyclic aromatic $C_5$-$C_{50}$ radical, a heteroaromatic $C_5$-$C_{50}$ radical, an alicyclic $C_3$-$C_{50}$ radical, and/or a heterocyclic $C_2$-$C_{50}$ radical, and wherein two or more R* may join together to form a ring structure.

In one or more aspects, the average thickness of the lubricant layer of the magnetic recording medium is less than about 10 nanometers (nm), or less than about 5 nm, or less than or equal to about 1 nm. In some aspects, the lubricant of the magnetic recording medium has an average thickness from about 0.1 nm to about 10 nm, or from about 0.1 nm to about 1 nm.

In one or more aspects of the magnetic recording medium, the lubricant may have a bonding percentage of at least about 30%, or at least about 50%, or at least about 70%, or at least about 80%, or at least about 90%, and less than or equal to about 99%, or less than or equal to about 95%, corresponding to a post-stripping bonding level of the lubricant to the total area of an upper surface of the protective overcoat.

In one aspect, a magnetic data storage system may include a magnetic head; a magnetic recording medium according to any one or a combination of aspects disclosed herein including a lubricant according to one or more aspects disclosed herein, a drive mechanism for moving the magnetic head over the magnetic recording medium; and a controller electrically coupled to the magnetic head for controlling operation of the magnetic head.

Media Fabrication

Figure 7:
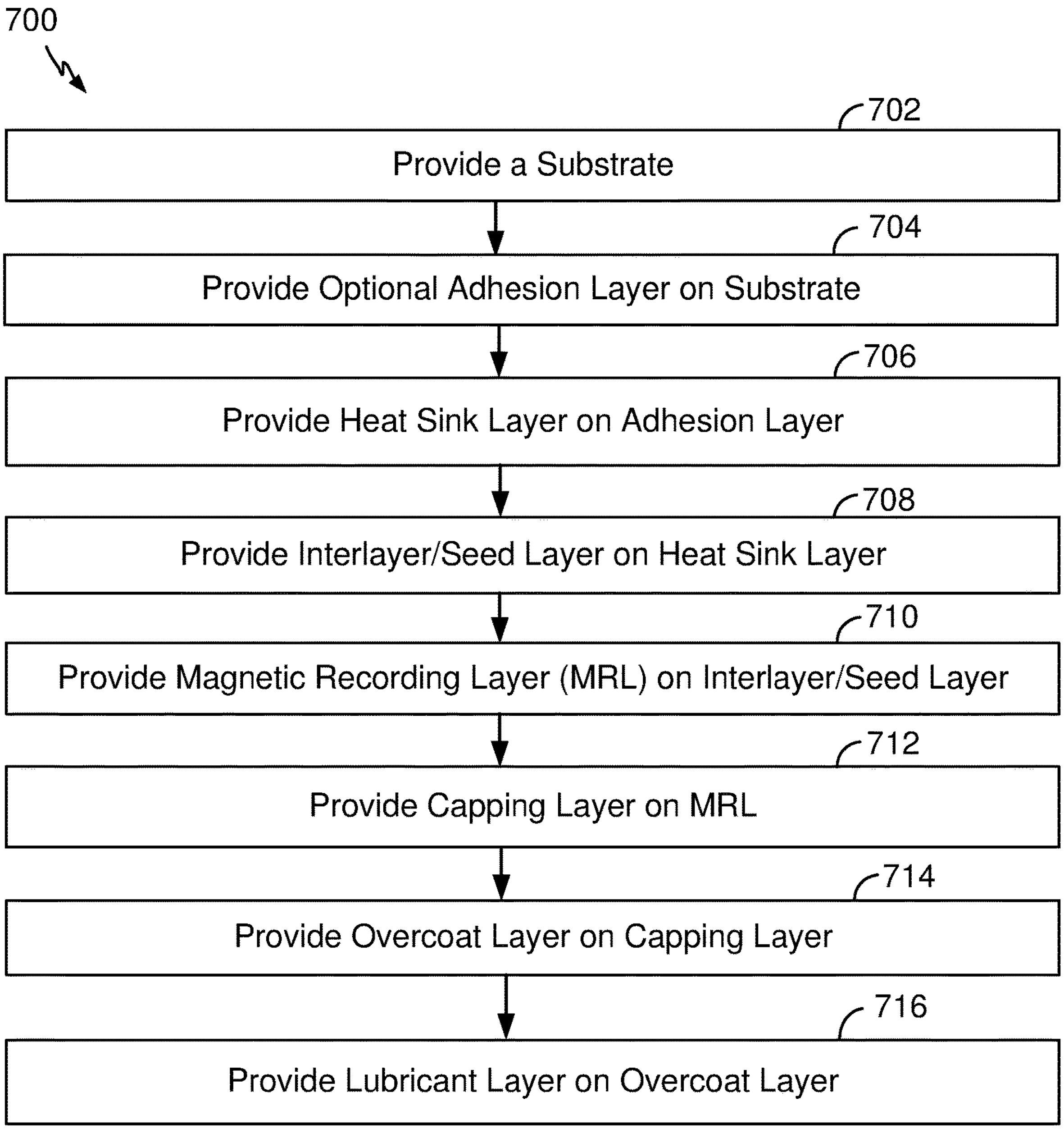
FIG. 7 is a flowchart of an exemplary process for fabricating a HAMR medium that includes a magnetic recording layer, a capping layer, an overcoat and a lubricant, in accordance with an aspect of the disclosure.

FIG. 7 is a flowchart of an exemplary process for fabricating a HAMR medium that includes a magnetic recording layer, a capping layer, an overcoat and a lubricant, in accordance with an aspect of the disclosure. In one aspect, the process 700 can be used to fabricate the HAMR media described above, including medium 200 shown in FIG. 2.

At block 702, the process provides a substrate (e.g., substrate 202). At block 704, the process provides an optional adhesion layer on the substrate (e.g., adhesion layer 204). At block 706, the process provides a heat sink layer on the adhesion layer (e.g., heat sink layer 206). In one aspect, at block 708, the process may additionally provide an interlayer/seed layer on the heat sink layer (e.g., interlayer 208). At block 710, the process provides a magnetic recording layer (MRL) on the interlayer/seed layer (e.g., MRL 210). At block 712, the process provides a capping layer on the MRL (e.g., capping layer 212).

At block 714, the process provides an overcoat layer on the capping layer (e.g., overcoat layer 214). At block 716, the process provides a lubricant layer on the capping layer (e.g., lubricant layer 216).

It is important to note that in alternative approaches, the lubricant layer formed above the protective overcoat may include any of the multidentate fluoroalkyl, fluoroalkenyl, perfluoroalkyl, or perfluoropolyether boundary lubricants described herein, singly and/or in any combination.

In various aspects, the lubricant layer can be formed on the magnetic recording medium, specifically on the protective overcoat, via a dip coating method. For instance, in one aspect the magnetic recording medium may be dipped into a lubricant bath including the multidentate perfluoropolyether boundary lubricant according to one or more aspects of the disclosure and a fluorocarbon solvent such as HFE7100 (methoxy-nonafluorobutane) or VERTREL-XF (hydrofluorocarbon fluid). After a predetermined amount of time, the magnetic recording medium may be pulled out from the lubricant bath at a controlled rate. The solvent may then evaporate, leaving behind a lubricant layer comprising the multidentate perfluoropolyether boundary lubricant. The bonding percentage is quantified by stripping the lubricated magnetic recording medium with the solvents used in the lubricant bath at various post-lube time periods.

The thickness of the lubricant layer may be tuned by controlling the submergence duration of the magnetic recording medium in the lubricant bath, the rate at which the magnetic recording medium is removed from the coating solution, and/or the concentration of the boundary lubricant (e.g. the lubricant according to one or more aspects of the disclosure) in the lubricant bath.

In one or more aspects, the concentration of lubricant in the lubricant bath may be in a range from about 0.001 g/L to about 1 g/L. In yet other aspects, the concentration of the lubricant in the lubricant bath may be selected so as to achieve a resulting lubricant layer with a thickness in a range of less than or equal to about 10 nanometers (nm), or less than or equal to about 5 nm, or less than or equal to about 1 nm or from 0.1 nm to less than about 1 nm.

Likewise, the formation of the lubricant layer on the surface of the magnetic recording medium, specifically on the surface of the protective overcoat, is not limited to dip coating, but may also involve spin coating, spray coating, a vapor deposition, combinations thereof, or any other suitable coating process as would be understood by one having skill in the art upon reading the present disclosure.

It should be noted that methodology presented herein for at least some of the various aspects may be implemented, in whole or in part, in computer hardware, by hand, using specialty equipment, etc. and combinations thereof.

Moreover, any of the structures and/or steps may be implemented using known materials and/or techniques, as would become apparent to one skilled in the art upon reading the present disclosure.

In some aspects, the processes herein can perform the sequence of actions as described above for media fabrication in a different order. In other aspects, the processes can skip one or more of the actions. In still other aspects, one or more of the actions are performed simultaneously. In some aspects, additional actions can be performed. For example, in one aspect, the process may include any additional actions needed to fabricate the magnetic recording layer structure.

In some aspects, the forming or deposition of such layers can be performed using a variety of deposition sub-processes, including, but not limited to physical vapor deposition (PVD), direct current (DC) sputter deposition, ion beam deposition, radio frequency sputter deposition, or chemical vapor deposition (CVD), including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

The terms “on,” “above,” “below,” and “between” as used herein refer to a relative position of one layer with respect to other layers. As such, one layer deposited or disposed on/above or below another layer may be directly in contact with the other layer or may have one or more intervening layers. Moreover, one layer deposited or disposed between layers may be directly in contact with the layers or may have one or more intervening layers.

Accordingly, the lubricants according to aspects of this disclosure demonstrate improved thermal stability/oxidation resistance, improved contamination robustness at sub-nanometer level, low profile for higher ADC with improved writability/readability, reasonable head wear and flyability performances, an improved bonding ratio, and improved processability/yields with an increased uniformity. The lubricants according to aspects of this disclosure are suitable for use in high-temperature applications while maintaining or improving mechanical interface integration robustness, reliability, and magnetic spacing.

The above description is made for the purpose of illustrating the general principles of the present disclosure and is not meant to limit the inventive concepts claimed herein. Further, particular features described herein can be used in combination with other described features in each of the various possible combinations and permutations.

It should be noted that in the development of any such actual aspect, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the device, system and/or method used/disclosed herein can also comprise some components other than those cited.

Unless otherwise specifically defined herein, all terms are to be given their broadest possible interpretation including meanings implied from the specification as well as meanings understood by those skilled in the art and/or as defined in dictionaries, treatises, and the like.

It must also be noted that, as used in the specification and the appended claims, the singular forms "a," "an" and "the" include plural referents unless otherwise specified.

Where a percentage of a material is specified herein, unless a type of the percentage is specifically specified, it can be any of weight percent, mole percent, atomic percent, mass percent or volume percent.

As also used herein, the term "about" denotes an interval of accuracy that ensures the technical effect of the feature in question. In various approaches, the term "about" when combined with a value, refers to plus and minus 10% of the reference value. For example, a thickness of about 20 angstroms (Å) refers to a thickness of 20 Å+/−2 Å, e.g., from 18 Å to 22 Å in this example.

In the summary and this detailed description, each numerical value should be read once as modified by the term "about" (unless already expressly so modified), and then read again as not so modified unless otherwise indicated in context. Also, in the summary and this detailed description, it should be understood that a physical range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

As used in the specification and claims, "near" is inclusive of "at." The term "and/of" refers to both the inclusive "and" case and the exclusive "or" case, and such term is used herein for brevity. For example, a composition comprising "A and/or B" may comprise A alone, B alone, or both A and B.

Various components described in this specification may be described as "including" or made of certain materials or compositions of materials. In one aspect, this can mean that the component consists of the particular material(s). In another aspect, this can mean that the component comprises the particular material(s).

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. It is further noted that the term "over" as used in the present application in the context of one component located over another component, may be used to mean a component that is directly on another component and/or in another component (e.g., directly on a surface of a component or embedded in a component). Thus, for example, a first component that is over the second component may mean that (1) the first component is over the second component, but not directly touching the second component, (2) the first component is directly on (e.g., directly on a surface of) the second component, and/or (3) the first component is in (e.g., embedded in) the second component. The term "about 'value X'", or "approximately value X," as used in the disclosure shall mean within 10 percent of the 'value X'. For example, a value of about 1 or approximately 1 would mean a value in a range of 0.9-1.1. In the disclosure various ranges in values may be specified, described and/or claimed. It is noted that any time a range is specified, described and/or claimed in the specification and/or claim, it is meant to include the endpoints (at least in one embodiment). In another embodiment, the range may not include the endpoints of the range. In the disclosure various values (e.g., value X) may be specified, described and/or claimed. In one embodiment, it should be understood that the value X may be exactly equal to X. In one embodiment, it should be understood that the value X may be "about X," with the meaning noted above.

While various aspects have been described above, it should be understood that they have been presented by way of example only, and not limitation. Thus, the breadth and scope of an aspect of the present invention should not be limited by any of the above-described exemplary aspects, but should be defined only in accordance with the following claims and their equivalents.

What is claimed is:

1. A fluorinated lubricant, comprising:

$$Rc—((Rb)_m—Re)_n \quad (I)$$

wherein Rc is a multivalent central group,

Rb is a main chain group having a constituent with a higher rotational energy threshold than $CF_2$, Re is an end group having an aromatic group and at least one anchoring functional group, m is from 2 to 50, and n is from 2 to 8, wherein the constituent with the higher rotational energy threshold than $CF_2$, comprises an aromatic group substituted with at least one of $—C_qR_{2q+1}$ or $—(C{=}O)—C_qR_{2q+1}$ where R is selected from the group consisting of F, Cl, Br and I, and q is from 1 to 6.

2. The fluorinated lubricant of claim 1, wherein the aromatic group in the constituent with the higher rotational energy threshold than $CF_2$ is selected from the group consisting of benzene, naphthalene, phenanthrene and anthracene.

3. The fluorinated lubricant of claim 1, wherein the constituent with the higher rotational energy threshold than $CF_2$ is ortho, meta or para substituted benzene.

4. A fluorinated lubricant, comprising:

$$Rc—((Rb)_m—Re)_n \quad (I)$$

wherein Rc is a multivalent central group,

Rb is a main chain group having a constituent with a higher rotational energy threshold than $CF_2$, Re is an end group having an aromatic group and at least one anchoring functional group, m is from 2 to 50, and n is from 2 to 8, wherein the constituent with the higher rotational energy threshold than $CF_2$, is ortho, meta or para substituted benzene, and unsubstituted sites on the ortho, meta or para Rb substituted benzene are perfluorinated, or wherein the constituent with the higher rotational energy threshold than $CF_2$ is selected from the group consisting of:

(V)

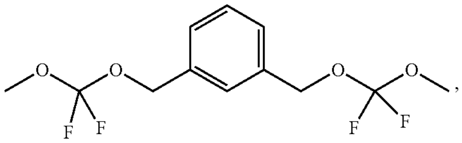

, (VI)

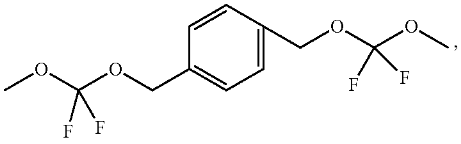

, (VII)

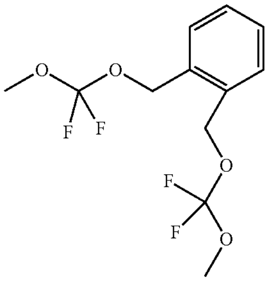

, and (iv)

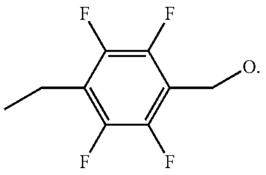

5. A fluorinated lubricant, comprising:

$$Rc—((Rb)_m—Re)_n \quad (I)$$

wherein Rc is a multivalent central group,

Rb is a main chain group having a constituent with a higher rotational energy threshold than $CF_2$, Re is an end group having an aromatic group and at least one anchoring functional group, m is from 2 to 50, and n is from 2 to 8, wherein the constituent with the higher rotational energy threshold than $CF_2$, is selected from the group consisting of:

(VIII)

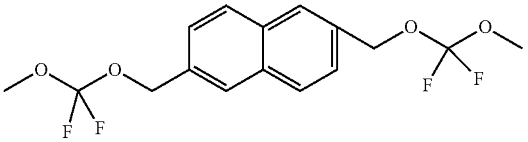

, (IX)

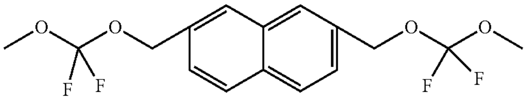

, (XII)

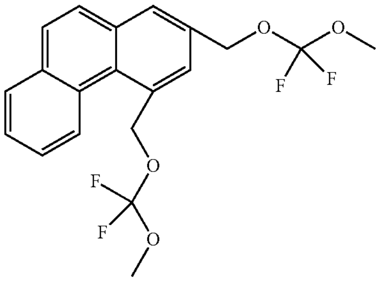

, and (XIII)

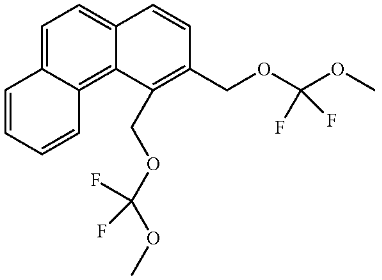

.

6. A magnetic recording medium, comprising:

a magnetic recording layer on a substrate;

a protective overcoat on the magnetic recording layer; and a lubricant layer comprising the lubricant according to claim 1 on the protective overcoat.

7. A data storage system, comprising:

at least one magnetic head;

a magnetic recording medium including the lubricant of claim 1;

a drive mechanism for positioning the at least one magnetic head over the magnetic recording medium; and a controller electrically coupled to the at least one magnetic head for controlling operation of the at least one magnetic head.

8. A data storage system, comprising:

a slider comprising at least one magnetic head and an air bearing surface (ABS), wherein a lubricant according to claim 1 is disposed on the ABS; and a magnetic recording medium including a magnetic recording layer;

wherein the slider is configured to write information to the magnetic recording layer using heat assisted magnetic recording (HAMR).

9. The fluorinated lubricant of claim 1, wherein Re contains an aromatic group selected from the group consisting of anisole, benzene, naphthalene, anthracene, phenanthrene, dibenz[a,h]anthracene, pyrene, catechol and benzopyrene.

* * * * *